United States Patent
Tsirkin

(10) Patent No.: US 12,242,598 B2
(45) Date of Patent: *Mar. 4, 2025

(54) FUNCTION POINTER PROTECTION

(71) Applicant: Red Hat, Inc., Raleigh, NC (US)

(72) Inventor: Michael Tsirkin, Westford, MA (US)

(73) Assignee: Red Hat, Inc., Raleigh, NC (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/489,545

(22) Filed: Oct. 18, 2023

(65) Prior Publication Data

US 2024/0045947 A1 Feb. 8, 2024

Related U.S. Application Data

(63) Continuation of application No. 17/185,461, filed on Feb. 25, 2021, now Pat. No. 11,816,206.

(51) Int. Cl.
*G06F 21/54* (2013.01)
*G06F 9/54* (2006.01)

(52) U.S. Cl.
CPC .............. *G06F 21/54* (2013.01); *G06F 9/547* (2013.01)

(58) Field of Classification Search
CPC ................................. G06F 21/54; G06F 9/547
USPC ........................................................... 726/22
See application file for complete search history.

(56) References Cited

U.S. PATENT DOCUMENTS

| | | | | |
|---|---|---|---|---|
| 6,725,281 B1* | 4/2004 | Zintel | .................... | H04L 69/329 709/224 |
| 6,892,230 B1* | 5/2005 | Gu | ......................... | H04L 67/51 370/254 |
| 8,561,176 B1* | 10/2013 | Dalcher | ................ | G06F 11/302 717/157 |
| 8,793,806 B1* | 7/2014 | Truong | ................. | H04L 63/101 713/182 |
| 9,026,859 B1 | 5/2015 | Pike | | |
| 10,049,212 B2 | 8/2018 | Fischer | | |
| 10,871,974 B1* | 12/2020 | Amit | .................... | G06F 9/30101 |
| 11,275,828 B1* | 3/2022 | Riley | ..................... | G06F 21/564 |
| 11,354,409 B1* | 6/2022 | Kenefick | ................. | G06F 21/51 |
| 11,403,074 B1* | 8/2022 | Gandhi | ................... | G06F 9/542 |

(Continued)

OTHER PUBLICATIONS

Coppolino, et al., "A Comprehensive Survey of Hardware-assisted Security: From the Edge to the Cloud" pp. 1-17, Apr. 2019, DOI: 10.1016/j.iot.2019.100055; Preprint submitted May 7, 2019; ResearchGate; University of Naples 'Parthenope', Centro Direzionale, Isola, Napoli—18 Pages.

(Continued)

*Primary Examiner* — Thanh T Le
(74) *Attorney, Agent, or Firm* — Kilpatrick Townsend & Stockton LLP

(57) ABSTRACT

A system includes a memory and a processor in communication with the memory. The processor is configured to supply a library with a list of safe callback values, protect the list of safe callback values, invoke a callback, and validate the callback against the list of safe callback values to determine a status of the callback. The status of the callback is one of safe and unsafe. Additionally, the processor is configured to execute the callback responsive to determining the status of the callback is safe. The processor is also configured to abort the callback responsive to determining the status of the callback is unsafe.

14 Claims, 6 Drawing Sheets

(56) References Cited

U.S. PATENT DOCUMENTS

| | | | | |
|---|---|---|---|---|
| 2002/0035621 | A1* | 3/2002 | Zintel | H04L 12/2809 |
| | | | | 709/220 |
| 2004/0133777 | A1* | 7/2004 | Kiriansky | G06F 21/554 |
| | | | | 713/166 |
| 2014/0208385 | A1* | 7/2014 | Xu | H04L 63/14 |
| | | | | 726/3 |
| 2015/0372980 | A1* | 12/2015 | Eyada | G06F 21/55 |
| | | | | 726/1 |
| 2017/0032118 | A1* | 2/2017 | Carson | G06F 21/566 |
| 2017/0032123 | A1* | 2/2017 | Carson | G06F 21/52 |
| 2018/0373896 | A1 | 12/2018 | Branco | |
| 2019/0303215 | A1* | 10/2019 | Marchiori | G06F 9/542 |
| 2019/0318080 | A1* | 10/2019 | Sandoval | G06F 11/3688 |
| 2020/0326945 | A1 | 10/2020 | Hu et al. | |
| 2021/0026951 | A1* | 1/2021 | Woodworth, Jr. | G06F 21/561 |
| 2022/0004644 | A1* | 1/2022 | Albero | G06F 21/6218 |
| 2022/0083644 | A1* | 3/2022 | Kulshreshtha | G06N 20/00 |

OTHER PUBLICATIONS

Baiju V. Patel, "Intel Releases New Technology Specifications to Protect Against ROP Attacks", Intel Corporation Published: Jun. 9, 2016, Last Updated: Jun. 9, 2016—2 Pages.

Ruan de Clercq and Ingrid Verbauwhede, KU Leuven; "A survey of Hardware-based Control Flow Integrity (CFI)" pp. 1-27, ACM Comput. Surv. V, N, Article A (January YYYY), Manuscript submitted Jul. 31, 2017—27 Pages.

\* cited by examiner

FUNCTION POINTER PROTECTION

CROSS-REFERENCE TO RELATED APPLICATION

The present application is a continuation of U.S. application Ser. No. 17/185,461, filed Feb. 25, 2021, the entire contents of which are incorporated herein by reference and relied upon.

BACKGROUND

Computer systems and applications running on such systems may utilize callback functions. Callback functions are functions where a function is passed as a parameter to another function. Callback functions are often used in libraries and frameworks and are designed to extend functions, such that the functions can be called back for specific events or circumstances. A callback function has a specific action which is bound to a specific circumstance. Therefore, a callback function is typically called once a clearly defined operation has been performed. For example, event handlers are one example of a type of callback function. While a normal function is called directly, a callback function is initially only defined and the function is called and executed once a specific event has occurred.

SUMMARY

The present disclosure provides new and innovative systems and methods for protection function pointers and validating callbacks prior to invocation. In an example, a system includes a memory and a processor in communication with the memory. The processor is configured to supply a library with a list of safe callback values, protect the list of safe callback values, invoke a callback, and validate the callback against the list of safe callback values to determine a status of the callback. The status of the callback is one of safe and unsafe. Additionally, the processor is configured to execute the callback responsive to determining the status of the callback is safe. The processor is also configured to abort the callback responsive to determining the status of the callback is unsafe.

In an example, a method includes supplying a library with a list of safe callback values, protecting the list of safe callback values, invoking a callback, and validating the callback against the list of safe callback values to determine a status of the callback. The status of the callback is one of safe and unsafe. Responsive to determining the status of the callback is safe, the method includes executing the callback. Additionally, responsive to determining the status of the callback is unsafe, the method includes aborting the callback.

In an example, a non-transitory machine-readable medium stores code which, when executed by a processor, is configured to supply a library with a list of safe callback values, protect the list of safe callback values, invoke a callback, and validate the callback against the list of safe callback values to determine a status of the callback. The status of the callback is one of safe and unsafe. Responsive to determining the status of the callback is safe, the non-transitory machine-readable medium is configured to execute the callback. Additionally, responsive to determining the status of the callback is unsafe, the non-transitory machine-readable medium is configured to abort the callback.

Additional features and advantages of the disclosed method and apparatus are described in, and will be apparent from, the following Detailed Description and the Figures. The features and advantages described herein are not all-inclusive and, in particular, many additional features and advantages will be apparent to one of ordinary skill in the art in view of the figures and description. Moreover, it should be noted that the language used in the specification has been principally selected for readability and instructional purposes, and not to limit the scope of the inventive subject matter.

DETAILED DESCRIPTION OF EXAMPLE EMBODIMENTS

Figure 1:
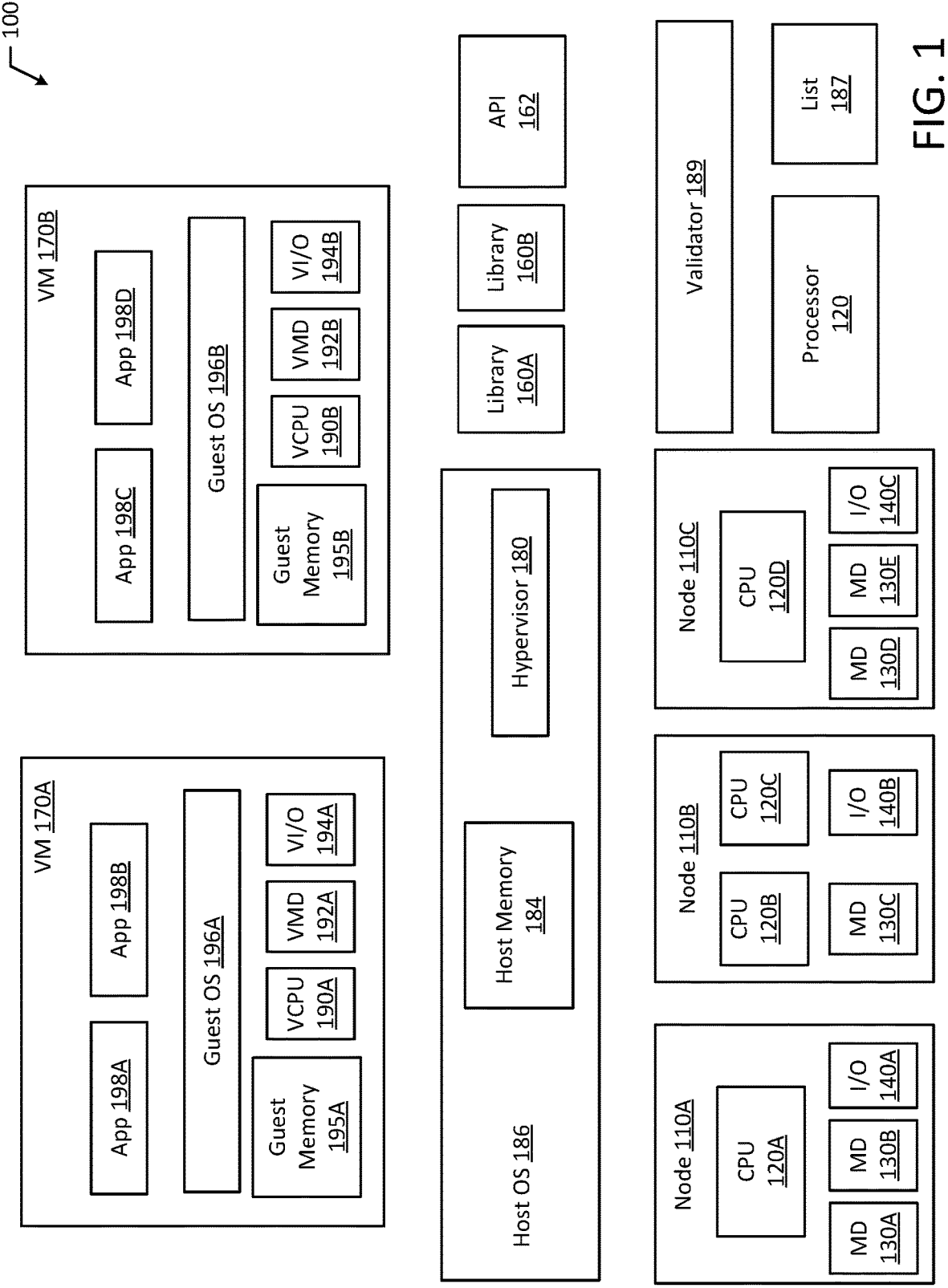
FIG. 1 illustrates a block diagram of an example computer system according to an example embodiment of the present disclosure.

Techniques are disclosed for function pointer protection. Computer systems may be attacked by abusing function pointer calls. For example, a library may obtain or access a pointer, store the pointer in memory, and call the pointer at a later time. By corrupting memory, an attacker may invoke an unrelated function, thereby abusing the function pointer call, as a security exploit. Function pointers are an attack vector for control-flow hijacking attacks, and many protection mechanisms have high overheads, are typically not compatible with existing processes, or both. Additionally, since a typical application loads a large number of libraries, the attack vector has a wide attack space, which increases the challenges faced in protecting against any of the libraries invoking an incorrect callback.

A function pointer, which may also be referred to as a subroutine pointer or a procedure pointer, is a pointer that points to a function (e.g., points to executable code within memory). Unlike normal pointers (e.g., data pointers) that point to data, a function pointer points to code. For example, a function pointer may store the start of executable code. A function pointer may be passed as an argument and may also be returned from a function. Dereferencing the function pointer yields the referenced function, which can be invoked and passed arguments, similar to a normal function call. Invoking a function pointer in this way is known as an indirect call because the function is being invoked indirectly through a variable instead of directly through a fixed identifier or address. Function pointers may simplify code by providing a simple way to select a function to execute based on runtime values. For example, many object oriented features in C++ are implemented using function pointers, such as virtual functions. Class methods are another example that is implemented using function pointers.

The attack described above may be achieved without using return-oriented programming ("ROP"), which is a computer security exploit technique that allows an attacker to execute code in the presence of security defenses such as executable space protection and code signing. For additional context, an attack using the ROP technique involves an attacker gaining control of the call stack to hijack program control flow and then execute machine instruction sequences that are already present in the machine's memory, called "gadgets." Each gadget typically ends in a return instruction and is located in a subroutine within the existing program and/or shared library code. Chained together, these gadgets allow an attacker to perform arbitrary operations on a machine employing defenses that thwart simpler attacks. Conversely, function pointers may be abused, for example with pointer subterfuge with exploits that modify a pointer's value. Function pointers may be overwritten to transfer control to attacker-supplied code (e.g., shellcode). Then, when the program executes a call via the function pointer, the attacker's code is executed instead of the intended code. In other examples, data pointers may be modified by an attacker when exploiting a buffer overflow vulnerability.

Some techniques, other than those disclosed herein, to improve security and validate that a function pointer is safe (e.g., of a specific type) involve including a type signature with the pointer. For example, a type signature may be placed at the beginning of a function, which disallows direct execution of the function and forces execution through an indirect call. However, it is common to have multiple functions with the same or identical type signatures (e.g., void* functions in C have identical type signatures), and thus the "type signature" technique is over-inclusive by disallowing direct execution of multiple functions when perhaps only a single function should be restricted. Furthermore, the "type signature" technique may be vendor or hardware specific and may be unable to block indirect calls.

Other techniques may involve avoiding callbacks. While avoiding callbacks entirely may provide enhanced security and performance, completely avoiding callbacks is impractical for many computer systems (e.g., C based systems).

According to the systems, methods and techniques disclosed herein, to protect against abusing function pointers as an attack vector for computer systems, a library can gain access to a list of safe callback values. For example, the library may gain an application programming interface ("API") with a list of safe callback values, such that whenever the library is accessed or invokes a callback, the library first validates the callback against the list. If the library is unable to validate the callback, the memory may be corrupt and the system can cause a safe abort, thereby preventing the function pointer from being abused as an attack vector.

The systems, methods and techniques, including providing a list of safe callback values that is referenced to validate a callback prior to invocation, disclosed herein advantageously (i) work for various function types, even if the functions have the same type, (ii) are vendor or hardware agnostic and can be implemented as software, (iii) are capable of blocking incorrect callback values, even when using an indirect call, and (iv) allow applications to use indirect calls, which may otherwise be avoided in some situations due to their abuse by speculative execution attacks. Additionally, the systems, methods and techniques disclosed herein may be implemented as a complimentary security feature and used together with other security techniques, such as the "type signature" technique described above.

Furthermore, the systems, methods and techniques disclosed herein are especially advantageous for improving security in large stack(s) of libraries. For example, an unexpected address containing a vulnerable function is typically more likely to be available in a large stack(s) of libraries. Locating the vulnerable function(s) in large stack (s) may be computationally burdensome. Furthermore, the size of the stack of libraries may increase the likelihood of vulnerable functions existing, providing several attack vectors to abuse function pointer calls. Conversely, a smaller stack(s) of libraries may reduce the likelihood of calling an unexpected callback that will have security implications.

FIG. 1 depicts a high-level component diagram of an example computing system 100 in accordance with one or more aspects of the present disclosure. The computing system 100 may include an operating system (e.g., host OS 186), one or more applications (e.g., applications 198A-D running in virtual machines 170A-B) and nodes (e.g., nodes 110A-C).

The applications 198A-D may run or execute in a virtual machine (e.g., virtual machine 170A-B), a container, etc. The virtual machine(s) ("VMs") may include a guest OS, guest memory, a virtual CPU (VCPU), virtual memory devices ("VMD"), and virtual input/output devices ("VI/O"). For example, VM 170A may include guest OS 196A, guest memory 195A, a virtual CPU 190A, a virtual memory device(s) 192A, and virtual input/output device(s) 194A. Virtual machine memory 195A may include one or more memory pages. Similarly, VM 170B may include guest OS 196B, guest memory 195B, a virtual CPU 190B, virtual memory device(s) 192B, and virtual input/output device(s) 194B.

The computing system 100 may also include a hypervisor 180 and host memory 184. The hypervisor 180 may manage host memory 184 for the host operating system 186 as well as memory allocated to the VMs (e.g., VM 170A-B) and guest operating systems (e.g., guest OS 196A such as guest memory 195A provided to guest OS 196A). Host memory 184 and guest memory 195A may be divided into a plurality of memory pages that are managed by the hypervisor 180. Guest memory 195A allocated to the guest OS 196A may be mapped from host memory 184 such that when an application 198A-B uses or accesses a memory page of guest memory 195A, the guest application 198A-B is actually using or accessing host memory 184.

In an example, VM 170A may execute a guest operating system 196A and run applications 198A-B which may utilize the underlying VCPU 190A, VMD 192A, and VI/O device 194A. For example, one or more applications 198A-B may be running on the VM 170A under the respective guest operating system 196A. VMs (e.g., VM 170A-B) may run on any type of dependent, independent, compatible, and/or incompatible applications on the underlying hardware and OS. In an example, applications (e.g., App 198A-B) run on a VM may be dependent on the underlying hardware and/or OS 186. In another example, applications 198A-B run on a VM may be independent of the underlying hardware and/or OS 186. For example, applications 198A-B running on a first VM 170A may be dependent on the underlying hardware and/or OS 186 while applications (e.g., application 198C) running on a second VM 170B are independent of the underlying hardware and/or OS 186A. Additionally, applications 198A-B running on VM 170A may be compatible with the underlying hardware and/or OS 186. In an example, applications 198A-B running on VM 170A may be incompatible with the underlying hardware and/or OS 186.

The applications 198A-D may load libraries 160A-B in run-time to perform and execute tasks. The libraries 160A-B may be extended with application program interfaces, such as API 162. In an example, the libraries 160A-B, referred to generally herein as library 160 or libraries 160, may access a list 187 that includes safe callback values. The list 187 may be referenced by a validator 189, the libraries 160, or a processor to validate a callback value before invoking the callback. The validator 189 may be a specialized hardware component configured to perform function pointer and callback validations. In another example, the validator 189 may be part of a processor, such as processor 120 or one of the processors (e.g., CPU 120A-D) on nodes 110A-C. The validator 189 may also be a functional component of one or more of the libraries 160. Through the validation process, function pointer calls and callbacks can be confirmed as safe before invocation, thereby improving security of the system.

The computer system 100 may include one or more nodes 110A-C. Each node 110A-C may in turn include one or more physical processors (e.g., CPU 120A-D) communicatively coupled to memory devices (e.g., MD 130A-D) and input/output devices (e.g., I/O 140A-C). Each node 110A-C may be a computer, such as a physical machine and may include a device, such as hardware device. In an example, a hardware device may include a network device (e.g., a network adapter or any other component that connects a computer to a computer network), a peripheral component interconnect (PCI) device, storage devices, disk drives, sound or video adaptors, photo/video cameras, printer devices, keyboards, displays, etc. VMs 170A-B may be provisioned on the same host or node (e.g., node 110A) or different nodes. For example, VM 170A and VM 170B may both be provisioned on node 110A. Alternatively, VM 170A may be provided on node 110A while VM 170B is provisioned on node 110B.

As used herein, physical processor, processor or CPU 120A-D, refers to a device capable of executing instructions encoding arithmetic, logical, and/or I/O operations. In one illustrative example, a processor may follow Von Neumann architectural model and may include an arithmetic logic unit ("ALU"), a control unit, and a plurality of registers. In a further aspect, a processor may be a single core processor which is typically capable of executing one instruction at a time (or process a single pipeline of instructions), or a multi-core processor which may simultaneously execute multiple instructions. In another aspect, a processor may be implemented as a single integrated circuit, two or more integrated circuits, or may be a component of a multi-chip module (e.g., in which individual microprocessor dies are included in a single integrated circuit package and hence share a single socket). A processor may also be referred to as a central processing unit (CPU).

As discussed herein, a memory device 130A-D refers to a volatile or non-volatile memory device, such as RAM, ROM, EEPROM, or any other device capable of storing data. The memory or portions of the memory provided by memory devices 130A-D may be write-protected. As discussed herein, I/O device 140A-C refers to a device capable of providing an interface between one or more processor pins and an external device capable of inputting and/or outputting binary data.

Processors (e.g., CPUs 120A-D) may be interconnected using a variety of techniques, ranging from a point-to-point processor interconnect, to a system area network, such as an Ethernet-based network. Local connections within each node, including the connections between a processor (e.g., CPU 120A-D) and a memory device 130A-D, may be provided by one or more local buses of suitable architecture, for example, peripheral component interconnect (PCI).

Figure 2:
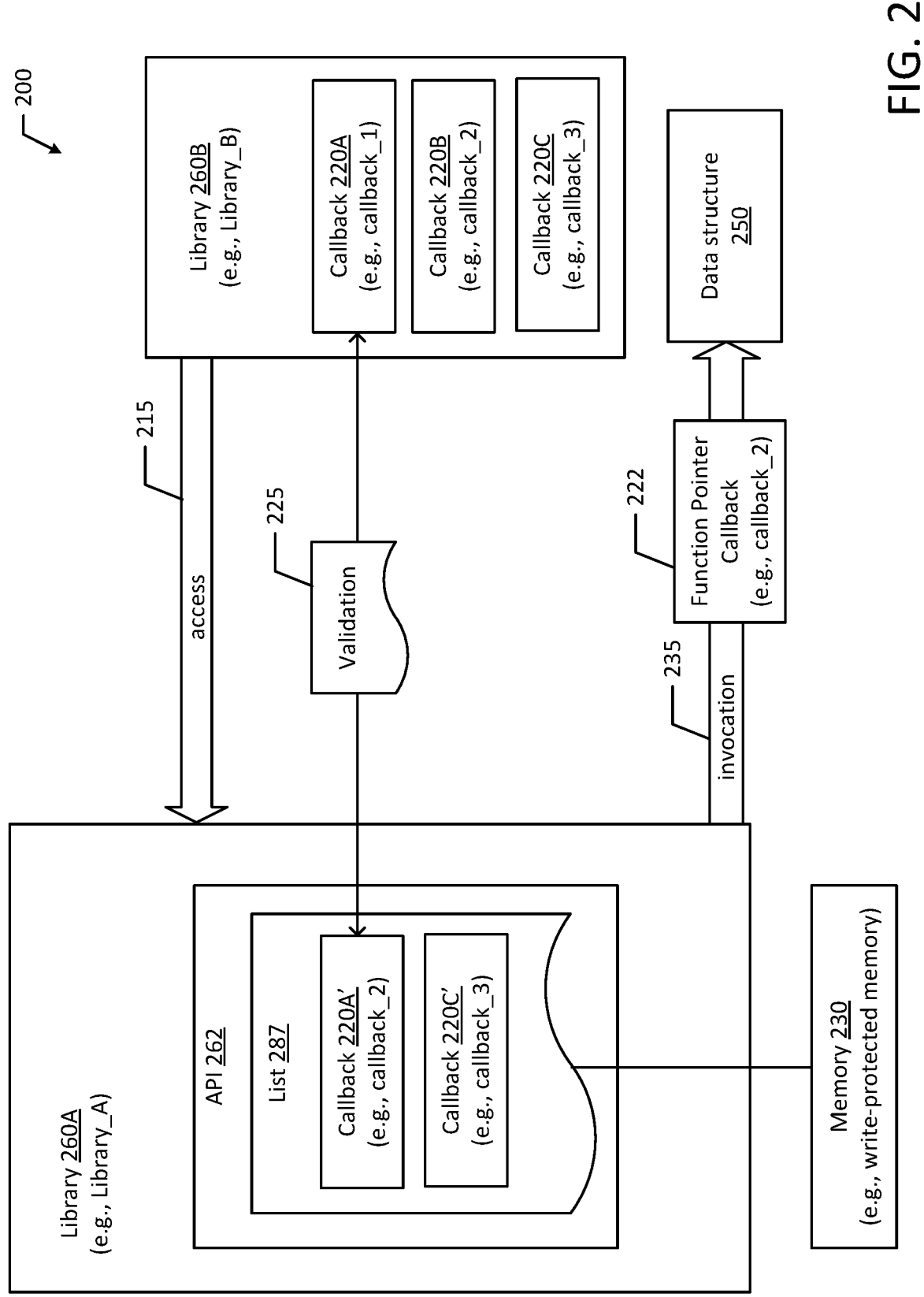
FIG. 2 illustrates a block diagram of an example function pointer protection system according to an example embodiment of the present disclosure.

For example, a function pointer may store the start of executable code. A function pointer may be passed as an argument and may also be returned from a function. Dereferencing the function pointer yields the referenced function, which can be invoked and passed arguments, similar to a normal function call. Invoking a function pointer in this way is known as an indirect call because the function is being invoked indirectly through a variable instead of directly through a fixed identifier or address. Function pointers may simplify code by providing a simple way to select a function to execute based on runtime values. For example, many object oriented features in C++ are implemented using function pointers, such as virtual functions. Class methods are another example that is implemented using function pointers FIG. 2 illustrates a block diagram of a function pointer protection system 200. As illustrated in FIG. 2, a library 260B may store function pointers and perform calls or callbacks to execute functions for an application (e.g., App(s) 198A-D) that load the library 260B. In the illustrated example, library 260B may access another library (e.g., library 260A). While accessing library 260A (e.g., through an access process 215), library 260B may also add an API 262 to library 260A. For example, library 260A may be modified with API 262, which contains a list 287 of safe callback values (e.g., callback 220A' and 220C'). In other examples, the API 262 may be added to the library 260A with a loader module that is extended with the API 262. Alternatively, the API 262 may be located and loaded by the library 260A (e.g., added to a special section of the binary of the library 260A).

The list 287 may be the same as list 187 illustrated in FIG. 1. As mentioned above, the list 287 includes safe callback values, which are safe functions to execute as callbacks. For example, the list 287 may include instruction pointer addresses that are safe to jump to. The list 287 may be write-protected, for example, by storing the list 287 in write-protected memory 230 to ensure that the list 287 maintains its values and prevent an accidental or intentional overwrite (e.g., via a malicious actor or a software bug).

When an application loads a library (e.g., library 260A-B, hereinafter referred to generally as library 260), the library 260A may invoke various callbacks (e.g., callbacks 220A-C). However, prior to invoking a callback (e.g., callback 220A), the library 260B accesses library 260A that is extended with the API 262 to perform a validation process 225 to ensure the callback is safe.

For example, the callback 220A may be compared to the safe values included in the list 287. If the callback 220A is included as a safe value on the list, then the callback is validated and the library 260B may proceed with invoking the callback 220A. In the illustrated example, callback 220A is a safe callback and is included on the list 287 and illustrated as callback 220A'. As illustrated in FIG. 2, callbacks 220A and 220C are safe callbacks that can be invoked and are illustrated in the list 287 as callback 220A' and callback 220C'. Once validated, the function pointer callback 222 (e.g., callback 220A) may be invoked through an invocation process 235. In the illustrated example, the function pointer callback 222 is callback 220A once invoked. Each of the callbacks 220A-C may be function pointer callbacks. In other examples, some of the callbacks (e.g., callbacks 220A-C) may be function pointer callbacks.

The callback may include executable code that is passed as an argument to other code that is expected to call back (e.g., execute) the argument at a given time. The execution may be immediate (e.g., as in a synchronous callback) or may occur at a later time (e.g., as in an asynchronous callback). In one example, the executable code may be provided in the form of a function pointer that stores at least some of the executable code. In an example, the callback may write data to a file or write data to a data structure 250.

If a respective callback (e.g., callback 220B) is unable to be validated as safe, then the callback may be safely aborted. For example, the library 260B may exit and return an error code to the application that loaded the library 260B.

Figure 3:
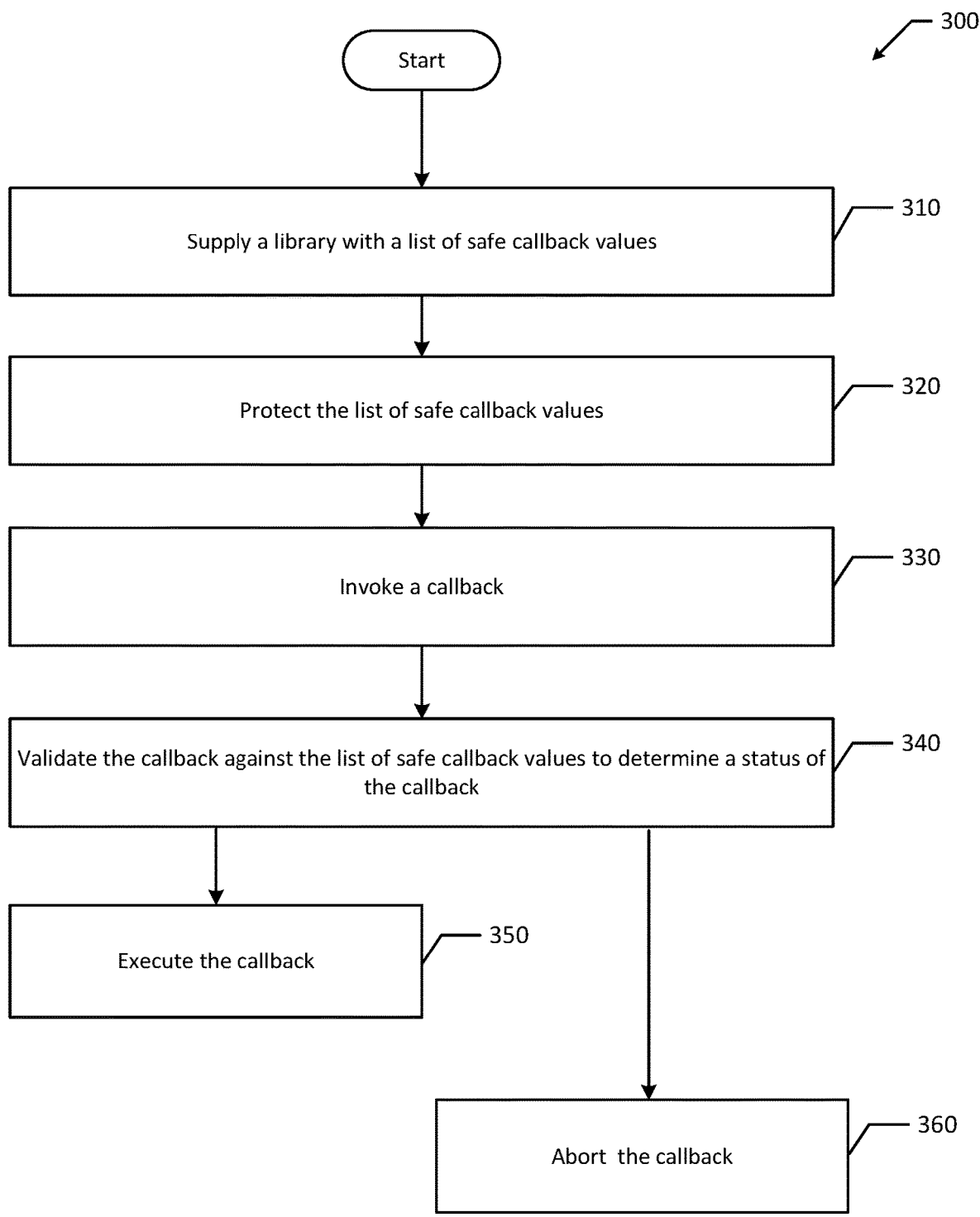
FIG. 3 illustrates a flowchart of an example process for validating callbacks according to an example embodiment of the present disclosure.

FIG. 3 illustrates a flowchart of an example method 300 for validating callbacks in accordance with an example of the present disclosure. Although the example method 300 is described with reference to the flowchart illustrated in FIG. 3, it will be appreciated that many other methods of performing the acts associated with the method 300 may be used. For example, the order of some of the blocks may be changed, certain blocks may be combined with other blocks, blocks may be repeated, and some of the blocks described are optional. The method 300 may be performed by processing logic that may comprise hardware (circuitry, dedicated logic, etc.), software, or a combination of both.

In the illustrated example, method 300 includes supplying a library with a list of safe callback values (block 310). For example, a library 260 may be supplied with a list 287 of safe callback values. Specifically, the list 287 may include functions that are safe to execute as callbacks, such as instruction pointer addresses that are safe to jump to. The method 300 also includes protecting the list of safe callback values (block 320). For example, the library 260 may protect the list 287 of safe callback values. The list 287 may be protected by saving the list 287 in write-protected memory 230. In another example, the memory location storing the list may be associated with a protection identifier in a page table such that the list 287 is read-only, thereby preventing other processes, libraries 260 or applications 198 from writing over the portion of memory storing the list 287.

Method 300 also includes invoking a callback (block 330). For example, an application 198 or a library 260 may invoke a callback 220. Specifically, during runtime, an application 198 may load the library 260 and invoke a callback 220 to write data to a file or data structure 250. The callback 220 may be a function pointer call. For example, the callback 220 may be a callback function that performs useful work (e.g., error handling, clean-up before existing, etc.), after an event occurs in another part of a process, program or application. When invoking the callback 220, the callback function may be registered (e.g., passed a function pointer as an argument to another function where the callback function is to be called). The callback function may be registered with "register callback." The callback function may be in a top layer while the function that will invoke the callback is in a different file layer. In this case, the higher layer function may call a lower layer function as a normal call and the callback mechanism allows the lower layer function to call the higher layer function through a pointer to the callback function (e.g., as a function pointer call or function pointer callback).

Then, method 300 includes validating the callback to determine a status of the callback (block 340). For example, the library 260 or a processor 120 may validate the callback 220 against the list 287 of safe callback values to determine a status of the callback 220. The status of the callback 220 may be either safe or unsafe. A safe status (e.g., a safe callback 220) may indicate that the callback 220 matches a respective callback 220' (e.g., callback value) on the list 287 of safe callback values. An unsafe status (e.g., an unsafe callback) may indicate that the callback 220 does not match a respective callback 220' (e.g., callback value) on the list 287 of safe callback values.

Additionally, method 300 includes executing the callback (block 350). For example, responsive to determining the status of the callback 220 is safe, the library 260 or the processor 120 may execute the callback 220. As mentioned above, the callback 220 may be a function pointer call or may include a function pointer call. By executing the callback after validation, the method advantageously provides function pointer protection and eliminates the attack vector of abusing function pointer calls. Additionally, method 300 includes aborting the callback (block 360). For example, responsive to determining the status of the callback 220 is unsafe, the library 260 or processor 120 may abort the callback 220. In an example, if the status of the callback 220 is unsafe, the callback may be aborted, allocation may fail, and/or a NULL may be returned to the application 198 or the library 260.

In an example, the callbacks may be associated with memory allocation functions (e.g., malloc( ) functions). The malloc( ) function allocates unused space for an object whose size in bytes is specified by size and whose value is unspecified. In an example, the pointer returned, if the allocation succeeds, may be assigned to a pointer to any type of object and then used to access such an object in the space allocated (until the space is explicitly freed or reallocated). Each such allocation may yield a pointer to an object disjoint from other objects. In an example, the pointer returned points to a start (lowest byte address) of the allocated space. If the space cannot be allocated, a NULL pointer may be returned. In an example, a library 260 may have a memory allocation hook (e.g., _malloc_hook), which can be set to an allocator. The API 262 may allow specifying malloc and g_malloc (e.g., a "gpointer" that allocates n_bytes of memory and if n_bytes is 0, then NULL is returned). Specifically, g_malloc returns a pointer to the allocated memory. However, supplying something other than g_malloc may lead to memory corruption. Prior to use, the callback may be validated (i.e., compared to both malloc and g_malloc) and if the callback does not match either malloc or g_malloc, the callback is aborted. Alternatively, the allocation may fail and NULL is returned.

Figure 4A:
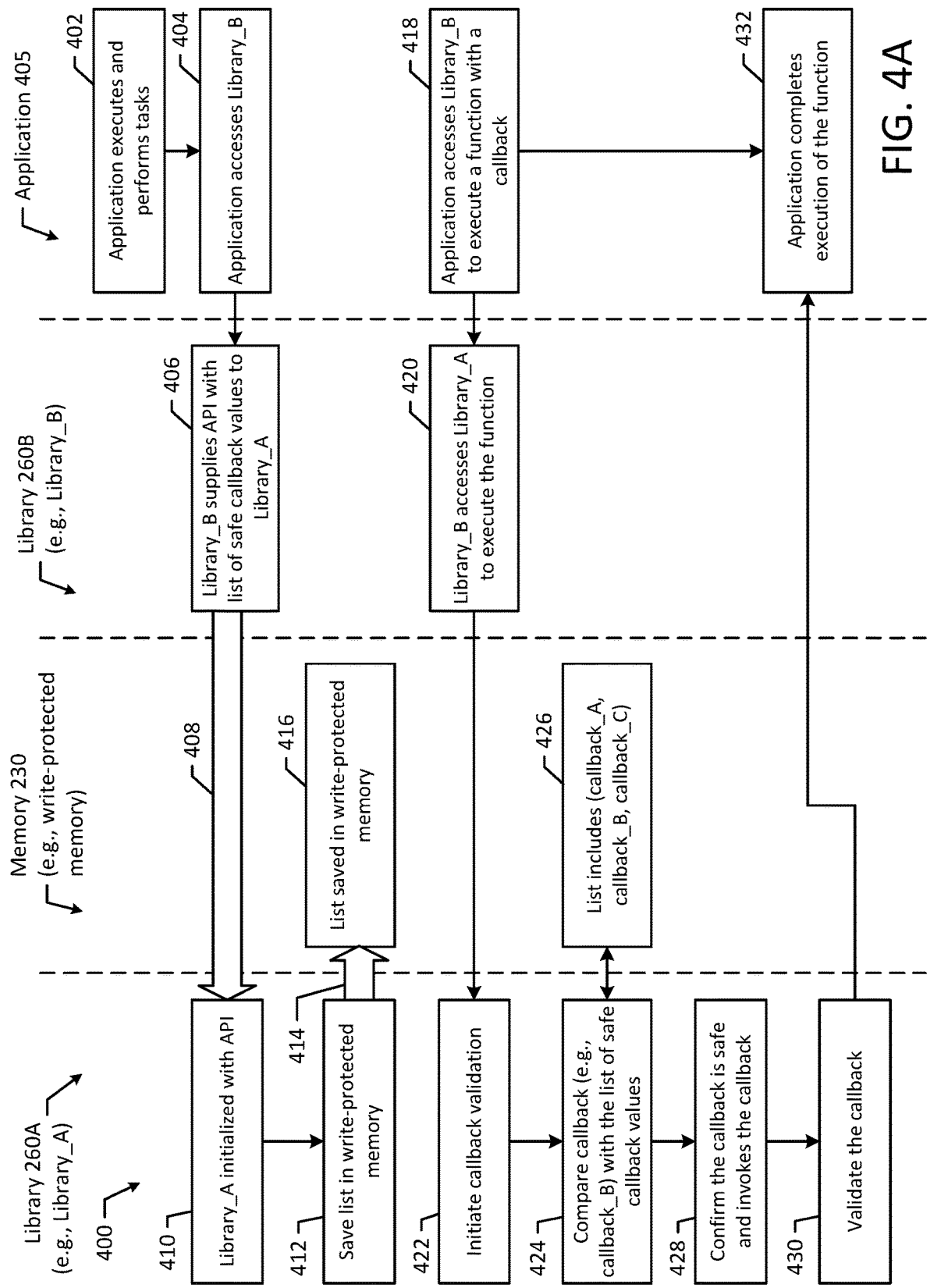
FIGS. 4A and 4B illustrate a flow diagram of an example process for protecting function pointers through callback validation according to an example embodiment of the present disclosure.
Figure 4B:
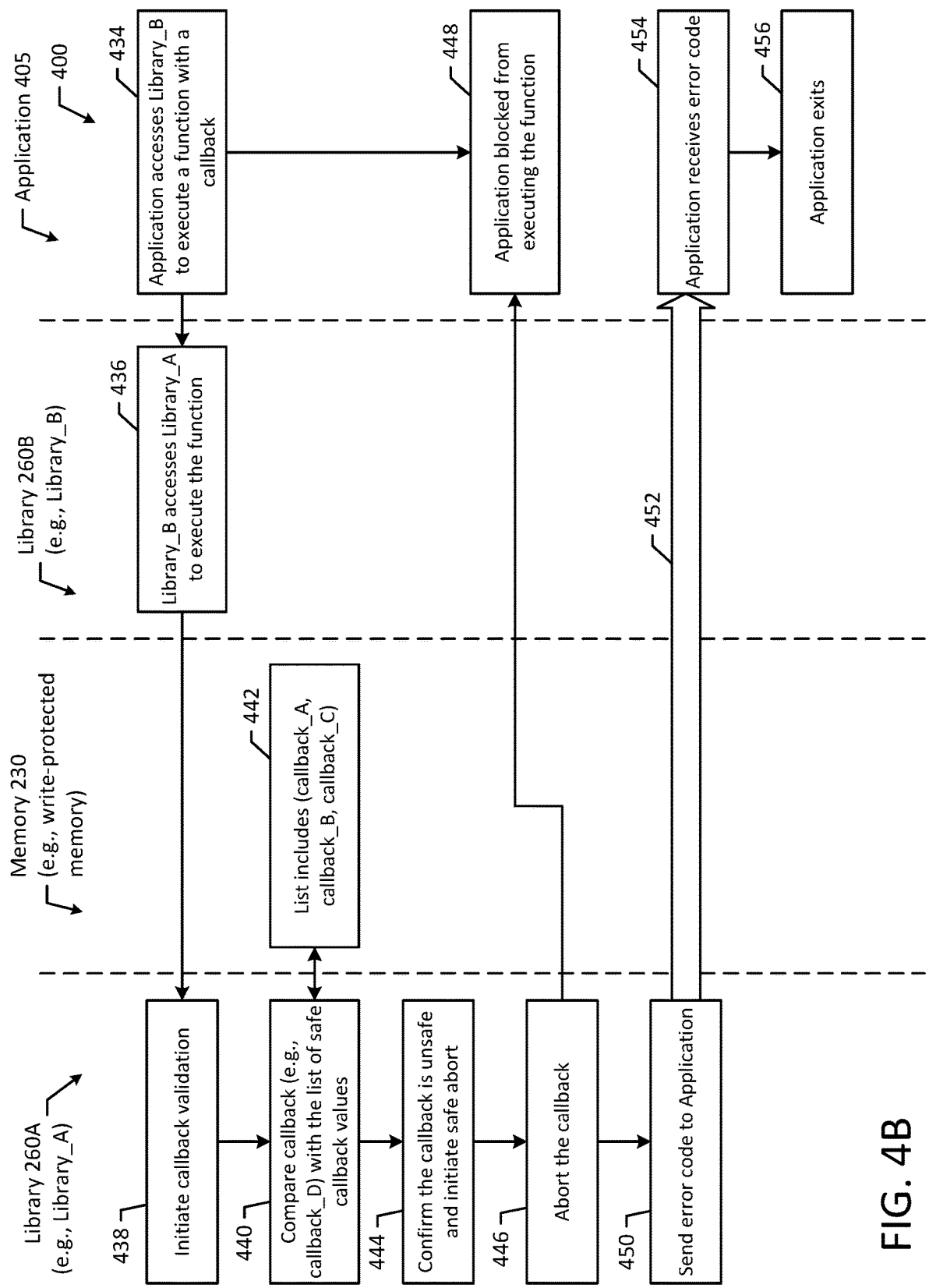

FIGS. 4A and 4B depicts a flow diagram illustrating an example method 400 for function pointer protection. Although the example method 400 is described with reference to the flow diagram illustrated in FIGS. 4A and 4B, it will be appreciated that many other methods of performing the acts associated with the method may be used. For example, the order of some of the blocks may be changed, certain blocks may be combined with other blocks, blocks may be repeated, and some of the blocks described are optional. The method may be performed by processing logic that may comprise (e.g., circuitry, dedicated logic, etc.), software, or a combination of both. For example, an application 405 may communicate with libraries 260A-B and memory 230 to perform example method 400.

In the illustrated example, application 405 may execute and perform tasks (block 402). For example, the application 405 may be associated with an interactive website that is capable of reacting to inputs. The application 405 may use various variables, objects, and functions that interact with one another to display results to a user regardless of the browser the user chooses. The displayed content on the website or the interactive buttons on the website may utilize callback functions. During operation, application 405 accesses library 260B (e.g., Library_B) (block 404). For example, the library may be accessed by the interactive website application 405 when displaying content to a user. The library 260B supplies an API 408 with a list of safe callback values to library 260A (e.g., Library_A) (block 406). In the illustrated example, the API 408 may include a list of safe callback values to protect against attack vectors, such as abusing function pointer calls that corrupt memory and allow an attacker to invoke unrelated functions. Then, the library 260A is initialized with the API 408 (block 410). Once initialized with the API 408, the list may be accessed to validate callback functions prior to invocation.

The library 260A saves the list 414 in memory 230 (block 412). In the illustrated example, memory 230 is write-protected memory. Saving the list 414 in write-protected memory ensures that the contents of the list are resistant to attacks or corruption. For example, write-protecting the list prevents other applications or processes from deleting, modifying or writing over the contents of the list 414. Then, the list 414 is saved in the write-protected memory 230 (block 416). Write-protection is a feature of memory 230, such as flash memory, that advantageously prevents data stored in the memory 230 from being deleted and new data from being added. The write-protection prevents an application or process from inadvertently writing over critical data (e.g., the list 414). During operation, application 405 accesses library 260B (e.g., Library_B) to execute a function with a callback (block 418). As noted above, the application 405 may access library 260B when displaying content on an interactive website. Then, the library 260B accesses another library 260A (e.g., Library_A) to execute the function (block 420). For example, the application 405 may load and access several libraries, some of which may interact with other libraries (e.g., library 260B interacting with library 260A). Once accessed, library 260A initiations callback validation (block 422). In the illustrated example, the library 260A may be enhanced or extended with an API with access to the list 414 to perform validations.

In the illustrated example, the library 260A compares the callback (e.g., callback_B) with the list 414 of safe callback values (block 424). For example, callback_B may be an instruction pointer address and the library 260A may compare the function pointer address with other function pointer addresses included in the list 414. The list 414 of safe callback values includes callback_A, callback_B and callback_C (block 426). Specifically, each callback may be a respective function pointer address and the list 414 may include address_A, address_B and address_C associated with each callback.

Since the callback (e.g., callback_B) matches one of the callback values in the list 414, library 260A confirms that the callback is safe and invokes the callback (block 428). Confirming that the callback is safe completes the validation process and the library validates the callback (block 430). By confirming the callback is safe prior to invoking the callback, the method 400 advantageously provides function pointer protection and eliminates the attack vector of abusing function pointer calls. Then, the application 405 completes execution of the function (block 432). For example, the application 405 may complete execution of the function, which may be associated with an HTML element, such as a button displayed on the interactive website. Specifically, a mouse click by the user may cause the callback function to be executed. In one example, the callback function may redirect the user to another page or may be used to send a value in a form being filled out on the interactive website.

Continuing on FIG. 4B, the application 405 accesses the library 260B (e.g., Library_B) to execute a function with a callback (block 434). Similar to the steps performed in FIG. 4A, the application 405 may again access the library 260B to execute various tasks that include callback functions. Then, Library 260B accesses another library 260A (e.g., Library_A) to execute the function (block 436). Again, the library 260A initiates callback validation (block 438). As previously mentioned, the library 260A may be enhanced or extended with an API with access to the list 414 to perform validations. For example, similar to block 422, the library 260A initiates callback validation. In the illustrated example, each callback is validated by library 260A prior to invocation. Even though the illustrated example only shows interactions between library 260B and library 260A, other libraries may also interact with library 260A to perform validations. Furthermore, library 260A may maintain multiple safe callback lists. For example, library 260A may have different safe callback lists for different applications 405 or libraries 260. In another example, safe callback lists may be combined, such that library 260A maintains a master list for various applications 405 and/or libraries 260.

In the illustrated example, the library 260A compares the callback (e.g., callback_D) with the list 414 of safe callback values (block 440). For example, callback_D may be an instruction pointer address and the library 260A may compare the function pointer address with other function pointer addresses included in the list 414. The list 414 of safe callback values includes callback_A, callback_B and callback_C (block 442). Specifically, each callback may be a respective function pointer address and the list 414 may include address_A, address_B and address_C associated with each callback.

Since the callback (e.g., callback_D) does not match one of the callback values in the list 414, library 260A confirms that the callback is unsafe and initiates a safe abort of callback (block 444). By confirming the callback is unsafe prior to invoking the callback, the method 400 advantageously provides function pointer protection and eliminates the attack vector of abusing function pointer calls, which prevents the potentially unsafe callback (e.g., callback_D) from executing. Then, library 260A aborts the callback (block 446). Aborting the callback may include performing an exit( ) or otherwise halting execution of the callback.

Since the callback is aborted, the application 405 is blocked from executing the function (block 448). In an example, the application 405 may be paused or closed after an unsafe callback is detected. For example, the application 405 may be paused or closed until the origin of the security threat or attack vector is identified and corrected. In the illustrated example, the library 260A sends and error code 452 to the application 405 (block 450). The error code 452 or error message may indicate to a user that a security threat exists. Then, the application 405 receives the error code 452 (block 454). Additionally, the application 405 may exit (block 456). As noted above, the application 405 may exit or close or pause until the security threat is purged from the system.

Figure 5:
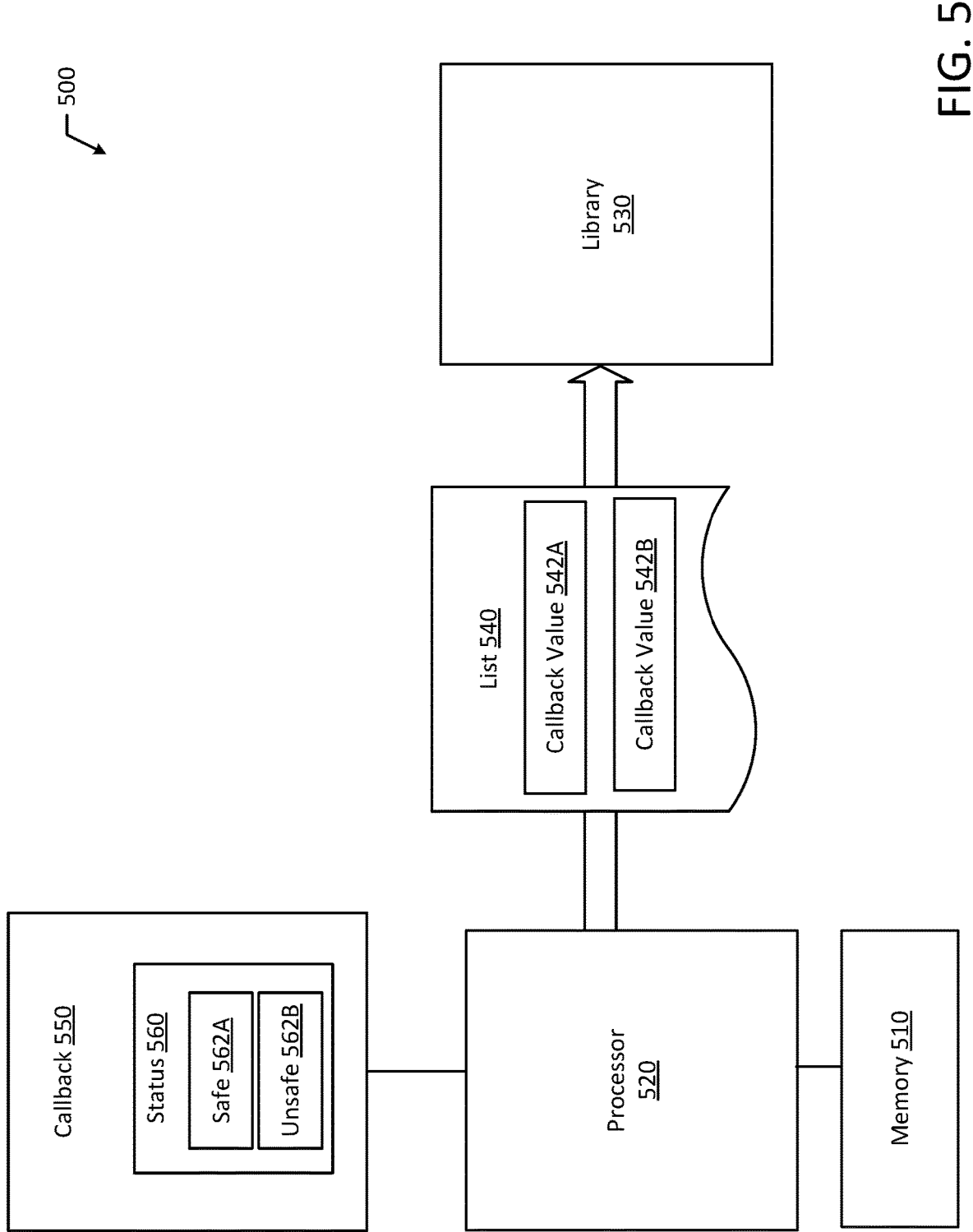
FIG. 5 illustrates a block diagram of an example callback validation system according to an example embodiment of the present disclosure.

FIG. 5 is a block diagram of an example callback validation system 500 for providing function pointer protection according to an example of the present disclosure. The callback validation system 500 includes a memory 510 and a processor 520 in communication with the memory 510. The processor 520 is configured to supply a library 530 with a list 540 of safe callback values 542A-B, protect the list 540 of safe callback values 542A-B, invoke a callback 550, and validate the callback 550 against the list 540 of safe callback values 542A-B to determine a status 560 of the callback 550. The status 560 of the callback is one of safe (e.g., safe status 562A) and unsafe (e.g., unsafe status 562B). Additionally, the processor 520 is configured to execute the callback 550 responsive to determining the status 560 of the callback is safe (e.g., safe status 562A). The processor 520 is also configured to abort the callback 550 responsive to determining the status 560 of the callback 550 is unsafe (e.g., unsafe status 562B).

By validating the callback(s) 550 as safe prior to invocation, unsafe callbacks may be aborted to improve system security. For example, unsafe callbacks may be prevented from being invoked thereby preventing abuse of function pointer calls that may allow an attacker to corrupt memory or attack the system through invoking unrelated functions.

It will be appreciated that all of the disclosed methods and procedures described herein can be implemented using one or more computer programs or components. These components may be provided as a series of computer instructions on any conventional computer readable medium or machine-readable medium, including volatile or non-volatile memory, such as RAM, ROM, flash memory, magnetic or optical disks, optical memory, or other storage media. The instructions may be provided as software or firmware, and/or may be implemented in whole or in part in hardware components such as ASICs, FPGAs, DSPs or any other similar devices. The instructions may be configured to be executed by one or more processors, which when executing the series of computer instructions, performs or facilitates the performance of all or part of the disclosed methods and procedures.

It should be understood that various changes and modifications to the example embodiments described herein will be apparent to those skilled in the art. Such changes and modifications can be made without departing from the spirit and scope of the present subject matter and without diminishing its intended advantages. It is therefore intended that such changes and modifications be covered by the appended claims.

The invention is claimed as follows:

1. A system, comprising:
   a memory; and
   a processor in communication with the memory, wherein the processor is configured to:
   load a first library for executing an application having a function with a callback,
   access, via the first library, a second library to execute the function,
   supply the second library with a list of safe callback values, wherein the list of safe callback values include instruction pointer addresses that are safe to jump to when executing the function of the application,
   prevent the list of safe callback values from being modified,
   validate the callback against the list of safe callback values to determine a status of the callback by at least comparing an instruction pointer address of the callback with the instruction pointer addresses of the list of safe callback values,
   responsive to determining the status of the callback is safe, execute the callback, and
   responsive to determining the status of the callback is unsafe, abort the callback.

2. The system of claim 1, wherein the first library stores function pointers and performs calls or callbacks to execute the function of the application.

3. The system of claim 1, wherein the processor is further configured to load an application programming interface (API) to the second library to validate the callback, wherein the API includes the list of safe callback values.

4. The system of claim 3, wherein the callback is associated with memory allocation functions.

5. The system of claim 4, wherein the API is configured to specify the memory allocation functions for determining the status of the callback.

6. A computer-implemented method, comprising:
   loading a first library for executing an application having a function with a callback;
   accessing, via the first library, a second library to execute the function;
   supplying the second library with a list of safe callback values, wherein the list of safe callback values include instruction pointer addresses that are safe to jump to when executing the function of the application;
   preventing the list of safe callback values from being modified;
   validating the callback against the list of safe callback values to determine a status of the callback by at least comparing an instruction pointer address of the callback with the instruction pointer addresses of the list of safe callback values;
   responsive to determining the status of the callback is safe, executing the callback; and
   responsive to determining the status of the callback is unsafe, aborting the callback.

7. The computer-implemented method of claim 6, wherein the first library stores function pointers and performs calls or callbacks to execute the function of the application.

8. The computer-implemented method of claim 6, further comprising loading an application programming interface (API) to the second library to validate the callback, wherein the API includes the list of safe callback values.

9. The computer-implemented method of claim 8, wherein the callback is associated with memory allocation functions.

10. The computer-implemented method of claim 9, further comprising specifying, via the API, the memory allocation functions for determining the status of the callback.

11. A non-transitory machine-readable medium storing code which, when executed by a processor is configured to:
   load a first library for executing an application having a function with a callback;
   access, via the first library, a second library to execute the function;
   supply the second library with a list of safe callback values, wherein the list of safe callback values include instruction pointer addresses that are safe to jump to when executing the function of the application;
   prevent the list of safe callback values from being modified;
   validate the callback against the list of safe callback values to determine a status of the callback by at least comparing an instruction pointer address of the callback with the instruction pointer addresses of the list of safe callback values;
   responsive to determining the status of the callback is safe, execute the callback; and
   responsive to determining the status of the callback is unsafe, abort the callback.

12. The non-transitory machine-readable medium of claim 11, wherein the first library stores function pointers and performs calls or callbacks to execute the function of the application.

13. The non-transitory machine-readable medium of claim 11, wherein the processor is further configured to load an application programming interface (API) to the second library to validate the callback, wherein the API includes the list of safe callback values.

14. The non-transitory machine-readable medium of claim 13, wherein the callback is associated with memory allocation functions, wherein the API is configured to specify the memory allocation functions for determining the status of the callback.

* * * * *